United States Patent
Maki et al.

(10) Patent No.: US 9,154,387 B2
(45) Date of Patent: Oct. 6, 2015

(54) SYSTEM AND METHOD FOR DISTRIBUTED DATA COLLECTION AND HEURISTIC REFINEMENT IN A NETWORK INTERMEDIARY DEVICE

(75) Inventors: Eric Maki, Kitchener (CA); Kevin Porter, Guelph (CA); Marcin Lukasz Lizon, Waterloo (CA)

(73) Assignee: Blue Coat Systems, Inc., Sunnyvale, CA (US)

( * ) Notice: Subject to any disclaimer, the term of this patent is extended or adjusted under 35 U.S.C. 154(b) by 498 days.

(21) Appl. No.: 13/017,028

(22) Filed: Jan. 30, 2011

(65) Prior Publication Data

US 2012/0198050 A1    Aug. 2, 2012

(51) Int. Cl.
*G06F 15/173*    (2006.01)
*H04L 12/26*    (2006.01)

(52) U.S. Cl.
CPC ............... *H04L 43/04* (2013.01); *H04L 43/045* (2013.01)

(58) Field of Classification Search
None
See application file for complete search history.

(56) References Cited

U.S. PATENT DOCUMENTS

| | | | |
|---|---|---|---|
| 7,302,455 B1* | 11/2007 | Cordsmeyer et al. ................. | 1/1 |
| 8,370,474 B1 | 2/2013 | Reeves et al. | |
| 2001/0039576 A1* | 11/2001 | Kanada ........................ | 709/223 |
| 2007/0192827 A1* | 8/2007 | Maxted et al. ..................... | 726/1 |
| 2008/0313207 A1* | 12/2008 | Modad et al. .................. | 707/102 |
| 2010/0131650 A1* | 5/2010 | Pok et al. ....................... | 709/226 |
| 2010/0169970 A1* | 7/2010 | Stolfo et al. .................... | 726/22 |
| 2010/0235514 A1* | 9/2010 | Beachem ....................... | 709/227 |
| 2011/0145386 A1 | 6/2011 | Stolorz et al. | |
| 2012/0078994 A1* | 3/2012 | Jackowski et al. ............ | 709/202 |

OTHER PUBLICATIONS

Office Action dated Jan. 4, 2013, from U.S. Appl. No. 13/017,027, filed Jan. 30, 2011, 22 pages.
Response to Office Action filed May 6, 2014, from U.S. Appl. No. 13/017,027, filed Jan. 30, 2011, 8 pages.
Final Office Action dated Aug. 14, 2013, from U.S. Appl. No. 13/017,027, filed Jan. 30, 2011, 19 pages.
Response to Final Office Action filed Nov. 14, 2013, from U.S. Appl. No. 13/017,027, filed Jan. 30, 2011, 7 pages.
Office Action dated Dec. 5, 2013, from U.S. Appl. No. 13/017,027, filed Jan. 30, 2011, 21 pages.
Response to Office Action filed Apr. 4, 2014, from U.S. Appl. No. 13/017,027, filed Jan. 30, 2011, 14 pages.
Final Office Action dated Jun. 13, 2014, from U.S. Appl. No. 13/017,027, filed Jan. 30, 2011, 20 pages.
Response to Final Office Action filed Sep. 15, 2014, from U.S. Appl. No. 13/017,027, filed Jan. 30, 2011, 15 pages.
Office Action dated Nov. 4, 2014, from U.S. Appl. No. 13/017,027, filed Jan. 30, 2011,18 pages.
Response to Office Action filed Feb. 4, 2014, from U.S. Appl. No. 13/017,027, filed Jan. 30, 2011, 4 pages.
Final Office Action dated Mar. 11, 2015, from U.S. Appl. No. 13/017,027, filed Jan. 30, 2011, 18 pages.
Response to Final Office Action filed Apr. 22, 2015, from U.S. Appl. No. 13/017,027, filed Jan. 30, 2011, 6 pages.

* cited by examiner

*Primary Examiner* — Brian D Nguyen
*Assistant Examiner* — Tejis Daya
(74) *Attorney, Agent, or Firm* — Ascenda Law Group, PC

(57) ABSTRACT

Data useful in analyzing the effectiveness of policies for handling transactions involving client communications is automatically collected at network intermediary devices and delivered to an analysis server as part of feedback communications from the network intermediary devices. The data may be collected according to data collection directives distributed to the network intermediary devices along with updates to policies for handling transactions, those updates being configured to alter actions of the network intermediary devices, for example to accommodate changes in behaviors of content servers from which the network intermediary devices obtain content in connection with the client communications.

16 Claims, 3 Drawing Sheets

SYSTEM AND METHOD FOR DISTRIBUTED DATA COLLECTION AND HEURISTIC REFINEMENT IN A NETWORK INTERMEDIARY DEVICE

FIELD OF THE INVENTION

The present invention relates generally to systems and methods for providing automated feedback regarding policies (e.g., caching policies) implemented at network intermediary devices (e.g., caching appliances) as part of feedback communications from those devices, said feedback being provided according to policies distributed to the network intermediary devices with other policy updates (e.g., caching policy updates).

BACKGROUND OF THE INVENTION

Typically, when a client computer system requests content from a server, whether over the Internet or, in some instances, over a local and/or wide area network, the request is intercepted at one or more intermediary devices, each of which may alter the request in some way, according to rules installed on the intermediary device. The intent of these rules, and their embodiment, are commonly known as policies. Policies thus define behaviors of the intermediary devices in connection with the requests.

One common form of intermediary device is a cache: a device that maintains copies of requested information (e.g., web pages and the like) so that multiple requests for the same information can be satisfied at the cache. When requests for information are satisfied at a cache, server devices need not receive the requests, process them, and retransmit the same information over a communication channel that links the client devices and the server devices. In the context of typical web browsing, for example, the server devices can be web servers, the client devices can be web clients (e.g., browsers running on personal computers and the like), the communication channel can be an Internet Protocol (IP) network such as the Internet, and the requested information can be web pages and or objects (e.g., images, videos, etc.).

Not surprisingly, in light of the above, caches are often instantiated with or operated according to policies that affect their behaviors in the context of the requests received at the caches and the sites for which the requests are destined. In particular, caches generally are provided with caching policies. These caching policies are sometimes written according to well-established and published guidelines for how certain content is to be cached (e.g. RFC 2616 promulgated by the Internet Engineering Task Force), but such policies do not always work well in the context of certain web sites. For example, with some web sites, specially defined policies may be required in order to dictate caching behavior that optimizes bandwidth savings. Often this may be due to web site designers not considering good cache efficiencies when designing their sites, but in other cases it may be due to the peculiarities of the content hosted at the site, the manner in which the content is stored at the servers, the physical or logical arrangements of the servers hosting the content of interest, or other factors.

In the past, in order to deal with these problematic (from a cache efficiency point of view) web sites, cache providers would have to develop custom solutions or "fixes" as individual customers (e.g. Internet service providers, enterprise network managers, and the like) reported problems. These custom solutions were often only developed after tedious review of voluminous log files obtained from the cache devices and were then distributed somewhat haphazardly as custom configuration files and the like to the cache providers' individual customers. Such distribution occurred through technical briefs, e-mail transmissions or postings on forums, and it was up to the customers to use and install them or not. This of course required knowledgeable customers and there was no guarantee that installing such a custom configuration file would even cure the problem that was initially observed. Thus, each caching problem was treated as a separate instance, with separate and disparate solutions being developed by researchers and others working in isolation from one another and even when solutions were deployed, there was no means of automated feedback to assess their impact or usefulness.

SUMMARY OF THE INVENTION

In various implementations the present invention provides for automatically collecting, at network intermediary devices, data useful in analyzing effectiveness of policies for handling transactions involving client communications instantiated at the network intermediary devices, and delivering that data from the network intermediary devices to an analysis server as part of feedback communications from the network intermediary devices. The data may be collected according to data collection directives distributed to the network intermediary devices along with updates to the policies for handling transactions. Such updates may be configured to alter actions of the network intermediary devices to accommodate changes in behaviors of content servers from which the network intermediary devices obtain content in connection with the client communications. A delivery schedule for the data may be periodic per network intermediary device, but randomized across the different network intermediary devices. The procedure may also include developing future information-gathering directives to be delivered to the network intermediary devices as part of an update to a policy for handling the transactions, for example based, at least in part, on the collected data.

Further embodiments of the invention include methods in which information-gathering directives for network intermediary devices (e.g., caches) are included in policy updates (e.g., cache policy updates) for those devices, the information gathering directives are delivered with the policy updates to the network intermediary devices, the network intermediary devices collect data according to the information-gathering directives, and return that data as part of feedback communications. The data so collected may include attributes of client requests received by the network intermediary devices; results of processing by the network intermediary devices, indications of whether objects were found (and, if so, by what mechanism they were found) in caches maintained at the network intermediary devices, and whether the objects were modified, revalidated, or replaced; individual metrics, or aggregated metrics, counts or accumulated values for a single quantity, counts or accumulated values broken down by a key generated from an aspect of traffic observed by the network intermediary devices; histograms of accumulated values which break down a single quantity by distribution; and/or keyed value tables which quantify consistency of discrete behaviors, indicate whether a behavior exhibits consistently or not, or if a behavior is non-uniform. Such data may also or otherwise include information useful for identifying web sites or other content sources that may respond well to an existing or in-service caching policy, sites that should not be subjected to site-specific caching policies, or information to help identify which network intermediary devices are or are not using previously published controls, rules, heuristics, or policies, etc.

Another embodiment of the invention provides a system in which a policy analysis server is communicatively coupled to a plurality of network intermediary devices to receive, from the network intermediary devices, data useful in analyzing effectiveness of policies for handling transactions involving client communications instantiated at the network intermediary devices, that data being received from the network intermediary devices as part of feedback communications from the network intermediary devices. The system may further include a policy distribution server communicatively coupled to the plurality of network intermediary devices and configured to deliver to the network intermediary devices a policy update that includes information-gathering directives for the network intermediary devices, those information-gathering directives updating data collection operations of the network intermediary devices. The policy update may also include caching policies for the network intermediary devices specifying site-specific behaviors for one or more web servers communicatively coupled to the network intermediary devices. The network intermediary devices may be configured to contact the policy distribution server periodically per network intermediary device to receive the policy update.

These and further embodiments of the invention are discussed in greater detail below.

BRIEF DESCRIPTION OF THE DRAWINGS

The present invention is illustrated by way of example, and not limitation, in the figures of the accompanying drawings, which illustrate various embodiments of the present invention.

DETAILED DESCRIPTION

Figure 1:
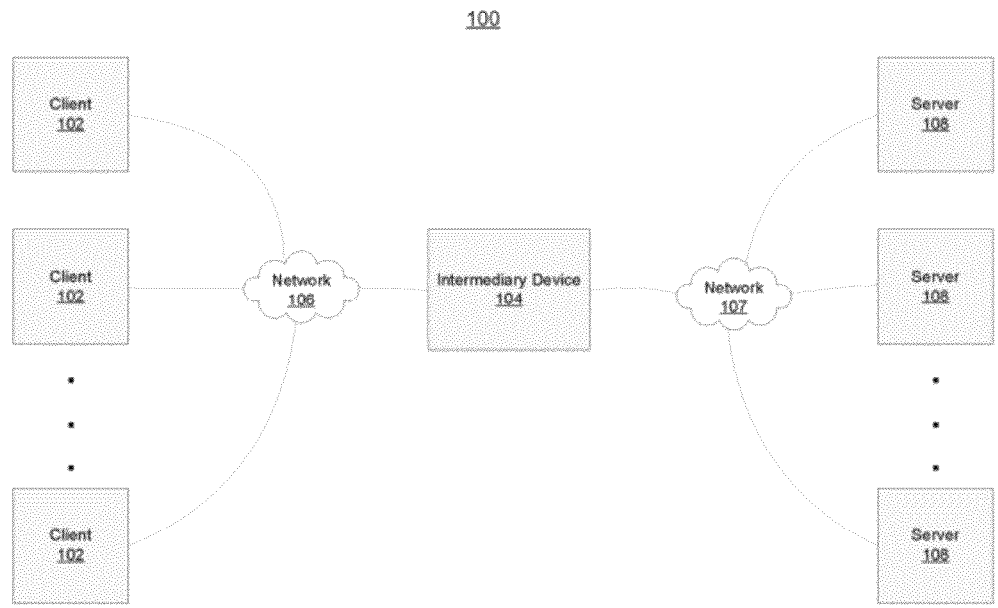
FIG. 1 illustrates a network having an intermediary device configured according to one embodiment of the present invention.

The present invention provides systems and methods for collecting and delivering automated feedback regarding policies (e.g., caching policies) implemented at network intermediary devices (e.g., caching appliances) as part of feedback communications from the network intermediary devices. The feedback is provided according to policies or other directives distributed to the network intermediary devices along with other policy updates (e.g., the caching policy updates), configuration changes or other, "lightweight" software distributions. These updates are designed to accommodate changes in the behavior of content servers and to effect other desired behaviors of the network intermediary devices without the need for full scale operating system updates and the like.

The present inventors have recognized that a subscription-based repository that provides manufacturer-approved policy updates and the like for network intermediary devices (such as caching appliances or other intermediary devices) can allow for secure and reliable distribution of those updates to these devices. While this is an improvement over the prior state of the art, it is a somewhat reactive solution. Stated differently, this solution for the distribution problem does not, in and of itself, address the need to identify potential problems (e.g., caching problems) and does not provide any feedback regarding the effectiveness of any proposed/deployed solutions. The present invention does address these related, and somewhat complementary, issues by providing a feedback mechanism in the distribution means for policy updates (e.g., caching policy updates) by which quantitative data regarding traffic, usage and policy decision results are delivered to an analysis center via a periodic monitoring/reporting communications from the network intermediary device. Such communications may include, in addition to the feedback contemplated by the present invention, information concerning the "health" of the network intermediary device (such information being conveyed in health monitoring communications), and/or operational characteristics thereof. In the present disclosure, we will use the term "feedback communication" to refer to such messages from the network intermediary device. In accordance with embodiments of the invention, data gathering is driven by the updating mechanism itself, which updates specify the data to be collected and the conditions under which it is to be gathered. That is, the network intermediary devices are "instrumented" for remote data gathering to assist in resolving the very problems being experienced, for example problems with the caching of problematic web sites and the like.

One example of a network intermediary device, which is discussed in connection with examples provided below, is a network caching appliance. The term "appliance" is sometimes used to describe a special-purpose computer system that requires minimal customer/operator intervention. The analogy is to a home appliance, which is expected by a home owner to function as intended when supplied with power and operated in accordance with its user instructions. Special-purpose computer systems may be implemented as network-attached appliances and may run system software, such as embedded operating systems, device drivers, or various utilities. While an appliance may be sold with a particular version of system software loaded on it, updates to such software, e.g., an upgrade to the embedded operating system or, in the case of the present invention, a policy, or a software patch addressing a defect, may become available after the appliance has been placed in service. Controlling access to policy upgrades is important from the appliance vendor's point of view (inasmuch as the vendor seeks to ensure that only authorized customers receive the benefit of the new software) and the appliance owner/user's point of view (inasmuch as the owner/user wishes to maintain configuration control over his/her equipment). Of course, in some instances the "appliance" nature of the network intermediary device will be realized through software or firmware control of general purpose hardware, and such devices are intended to be within the scope of the present invention. Further, the present invention is applicable to intermediary devices other than just caching appliances.

Some portions of the detailed descriptions that follow are presented in terms of algorithms and symbolic representations of operations on data within a computer memory or other storage device. These algorithmic descriptions and representations are the means used by those skilled in the data processing arts to most effectively convey the substance of their work to others skilled in the art. An algorithm is here, and generally, conceived to be a self-consistent sequence of processing blocks leading to a desired result. The processing blocks are those requiring physical manipulations of physical quantities. Throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including hard disks, optical disks, CD-ROMs, and magnetic-optical disks, read-only memories (ROMs), random access memories (RAMs), electrically programmable ROMs (EPROMs), electrically erasable and programmable ROMs (EEPROMs), flash memories, or other types of storage media suitable for storing electronic instructions.

Moreover, terms such as "request", "client request", "requested object", or "object" may be used interchangeably to mean action(s), object(s), and/or information requested by a client from a network device, such as an intermediary or a server. In addition, the terms "response" or "server response" may be used interchangeably to mean corresponding action(s), object(s) and/or information returned from the network device. Furthermore, the terms "communication" and "client communication" may be used interchangeably to mean the overall process of a client making a request and the network device responding to the request.

FIG. 1 is a block diagram of one embodiment of a network system 100 utilizing a network device, such as an intermediary device. It comprises any number of client devices 102 connected to an intermediary device 104 via a network 106. A client device 102 ("client") is a computing device capable of making a request (e.g., for an object, service, etc.) over the network 106 and receiving a response for the request. For instance, the client 102 may be a personal computer (PC), a hand-held device or personal digital assistant (PDA) type device, a mobile phone, a tablet computer, etc. In one embodiment, the client is a PC running a web browser application and may make requests for objects over the network 106 by utilizing the web browser. Each client device is coupled to the intermediary device using a client communication path that can include a dial-up connection, a LAN, a WAN, an IP network (such as an internet, intranet, or extranet), or some combination thereof. As used herein, the terms "client" and "server" refer to relationships between the client or server and the intermediary device, not necessarily to particular physical devices. As used herein, the term "client device" includes any device taking on the role of a client in a client-server environment. There is no particular requirement that the client devices 102 must be individual devices; they can each be a single device, a set of cooperating devices, a portion of a device, or some combination thereof.

The intermediary device 104 is a computing device capable of receiving and responding to the request made by the client 102. In one embodiment, the intermediary device 104 is a cache appliance with an internal object store housing objects that may be requested by the client 102. The intermediary device is communicatively coupled to any of a number of content servers 108 via a network 107.

Networks 106 and 107 may be distinctly separate networks or the same (or portions of the same) network and may be any kind of networks known in the art. For instance, networks 106 and 107 may be private networks, such as intranets, extranets, local area networks (LANs), or wide area networks (WANs). Networks 106 and 107 may also be (in whole or in part) public networks, such as the Internet. Furthermore, many computer devices have multiple network interfaces and, thus, networks 106 and 107 may contain multiple upstream or downstream networks of wired and/or wireless segments. Nevertheless, in the interest of brevity, networks 106 and 107 will hereafter be referred to by the general term "network" to mean any kind of medium over which the client 102 and the intermediary device 104 communicate.

Servers 108 provide content to the intermediary device 104. The purpose of the plurality of servers 108 is to provide requested objects to the intermediary device 104 when the intermediary device 104 does not have the objects in its object store. The intermediary device 104 has the ability to query any one of the plurality of servers 108 for the objects. Servers 108 are computer devices that can receive the query and respond in kind with the requested object(s). Each server device is coupled to the intermediary device using a server communication path that can include a dial-up connection, a LAN, a WAN, an IP network or some combination thereof. In one embodiment, the server communication path includes an internet backbone and an internet connection between the intermediary device and the internet backbone. As used herein, the term "server device" includes any device taking on the role of a server in a client-server environment. There is no particular requirement that the server devices 108 must be individual devices; they can each be a single device, a set of cooperating devices, a portion of a device, or some combination thereof. Generally, a server device will include memory or storage for recording one or more web objects, which can be any type of data suitable for transmitting to the client device 102 (e.g., text, color, formatting and directions for display; pictures, data in graphical formats (such as GIF or JPEG), other multimedia data; animation, audio (such as streaming audio), movies, and video (such as streaming video), and other data in audio or visual formats (such as MPEG); program fragments, including applets, Java, JavaScript, and ActiveX; and other web documents and data types).

Figure 2:
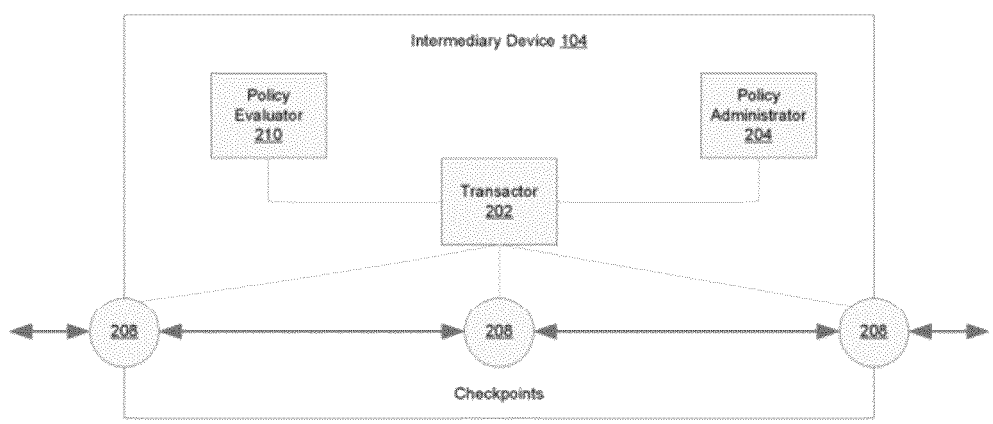
FIG. 2 illustrates further details of the intermediary device configured according to one embodiment of the invention.

FIG. 2 is a block diagram of one embodiment of an intermediary device 104, according to the present invention. Intermediary device 104 includes a transactor 202, a policy administrator 204, a plurality of checkpoints 208, and a policy evaluator 210. The transactor 202 is configured to establish a connection at the beginning of a client/intermediary device communication ("client communication"), facilitate the progress of a request and response throughout the client communication, and close the connection at the end of the client communication. Transactor 202 may be protocol specific, to facilitate requests made according to distinct communication protocols, or may be protocol agnostic in order to accommodate multiple different protocols.

The policy administrator 204 is configured to maintain a current version of policies and assign to the transactor 202 the most current version of a policy available at the time the client communication begins. The transactor thus handles the client communication in accordance with the assigned policy specified by the policy administrator. In some instances, the client communication may be defined by various checkpoints 208 and the transactor may perform designated activities (in accordance with the policy) when the client communication reaches those checkpoints. In various instances there may be more or fewer checkpoints that are illustrated in the diagram. Policy evaluator 210 collects statistics regarding the operation of transactor 202 for various communications and policies, for use in accordance with the present invention. For example, the policy evaluator may be instrumented to collect information such as attributes of user requests, results of intermediary device processing (e.g., were requested objects found in the cache, and, if so, by what mechanism were they found; were they modified, revalidated or replaced, etc.), and/or to compute aggregated statistics such as the number or trends for items or events of interest, or the number or trends of specified key-value pairs. Any or all of this collected information can later be used by the analysis center to fine tune existing policies, such as caching directives, or instantiate entirely new ones for distribution as part of a next or future policy update. Indeed, the collected information can be used to facilitate production of new data gathering policies which can then be deployed as part of a next or future update.

Figure 3:
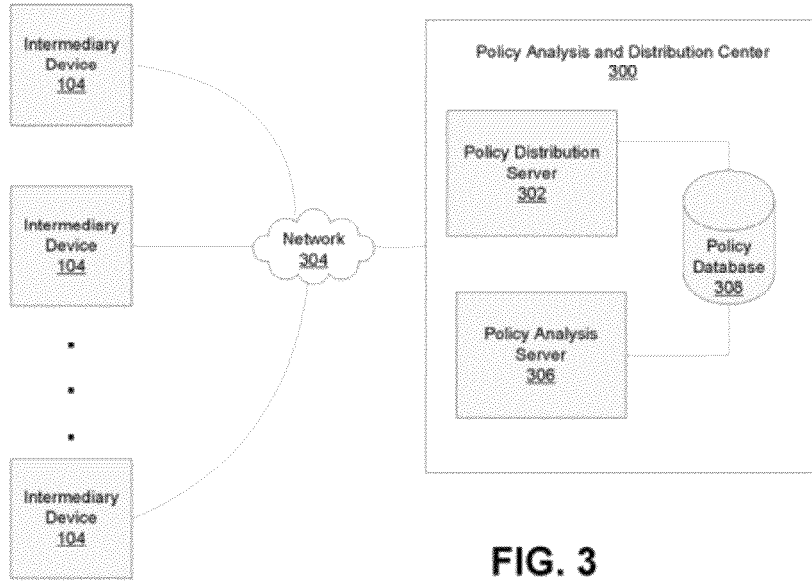
FIG. 3 illustrates the deployment of a policy distribution server within a network in accordance with an embodiment of the present invention.

FIG. 3 shows a block diagram of a system having multiple intermediary devices 104 (e.g., caches) communicatively coupled to a policy analysis and distribution center 300. The policy analysis and distribution center may include one or more servers, such as a policy distribution server 302 and a policy analysis server 306, although in other embodiments the functions provided by these servers may be included in more or fewer devices, and is communicatively coupled to the intermediary devices via a network 304. Although not shown in this view, it should be recognized that each of the intermediary devices 104 may service multiple clients and thus be communicatively coupled to multiple servers across one or more networks. Like networks 106 and 107, network 304 may be any public and/or private network and the policy data server-to-intermediary device communication path may include direct connections, or connections over a LAN, a WAN, an IP network, etc.

As indicated above, some intermediary devices, such as cache appliances are intended, at least in part, to save transit bandwidth costs by caching user-requested web content. However, many web destinations do not cache well with simple or generic rules and require tuned, site-specific policies. Other intermediary devices may be deployed with other or additional goals in mind. For example, some intermediary devices may seek to improve request response times and/or provide transcoding or translations of requests (in addition to or in lieu of bandwidth savings, for example). In general, such devices are often aimed at reducing costs (however measured) and/or improving client "experiences", and such improvements may be measured by a variety of different metrics. Achieving these goals requires a set of policies that is both flexible and broad in coverage.

The policy distribution server 302—a centralized, subscription-based distribution node for network intermediary device vendor-approved solutions—provides an effective means for distributing these policies (e.g., site-specific caching policies) to network intermediary devices (e.g., caching appliances and other devices/systems). The policy distribution server maintains a policy database 308 where policy updates may be stored for distribution to the various intermediary devices. The updates (which may, in some instances be caching policy updates) may be stored to the database by the policy analysis server 306 after they are fashioned and may include directives in policy languages, global configuration changes, or other modifications to system behavior that effect the desired improvement of device functionality (e.g., caching functionality), and in some cases may be expressed in a cache policy language.

As used herein, the term policy refers to configuration values and rules applied to render decisions on client connections and the like. Often, the policy references system configuration for the default values for some settings and then evaluates rules to see if those settings should be overridden. The policies may be expressed in a caching policy language, and/or as files, databases, signature-oriented rules, or other forms and formats. However expressed, the policies are instantiated on an intermediary device (e.g., after being downloaded from the policy distribution server), and are evaluated during request processing (e.g., in some instances to override any default decisions taken from configuration files at the intermediary device).

Unlike software updates, which may comprise entire operating system or application programs in and of themselves, or at a minimum are generally large pieces of software, the subject policy updates are lightweight in nature (e.g., are not files of a size typically associated with distributions of operating system updates and the like). The policies expressed by these updates dictate how the intermediary devices should handle various situations, for example, the caching of identified web sites (or other content sites), which require particularized solutions. In some embodiments, the policies distributed in the context of updates control operations of the intermediary devices which are not exposed to users thereof. The policies may be generic, in the sense that they apply to any web site or to all web sites with some identified exceptions, or site-specific. They may be generic or network intermediary device-specific. Among the examples of policies that may be distributed in this fashion are directives to cache or not to cache specified web sites and/or objects, to employ specific caching methodologies with respect to specified sites or objects, and/or to cache specified web sites or objects beyond their respective times to live, etc.

The distribution of the policy updates may be handled on a subscription basis. That is, only intermediary devices that are associated with subscription accounts may be eligible to receive the updates. This subscription-based distribution may be managed by having the policy administrators of the intermediary devices periodically contact the policy distribution server in order to check for policy updates. An intermediary device's entitlement to a policy update may be determined by the policy distribution server issuing a challenge for authorization credentials, such as a unique user name/password combination, a device serial number or other identifying information. When an intermediary device's authentication credentials are presented to the policy distribution server, the device's entitlement to the policy update(s) is (are) checked, and, if it is determined that the intermediary device is indeed entitled to the update, the appropriate policy update is supplied. So that the policy distribution server is not overwhelmed, the various intermediary devices may be configured to contact the policy distribution server at different times than one another and/or at random or pseudo-random times.

In some cases, one policy update may be provided to all authorized intermediary devices, with different policies coded for use by specific intermediary devices. For example, certain policies may be coded for use only by intermediary devices of a particular customer, by intermediary devices deployed in particular countries or regions, by devices deployed on certain kinds of network connections, by devices having certain versions of operating systems, etc. Alternatively, the policy distribution server may provide unique policy updates to different intermediary devices on the basis of the identities of the devices. That is, the intelligence for determining which updates to apply or instantiate at which intermediary device may reside on the intermediary device, on the policy distribution server, or on both.

Of course, delivering policy updates is only effective if means exist for determining what kind of updates are needed and when. Content servers may alter their behaviors at any time, thus rendering any previously deployed caching policies obsolete or at least ineffective. Accordingly, comprehensive identification of caching problems is a prerequisite for delivering effective solutions, but outside of anecdotal reports from users running pre-planned tests, such identification is a task that hitherto entailed analysis of vast quantities of often inaccessible or difficult to comprehend data.

To address the need for knowledge concerning the effectiveness of the installed base of policies in intermediary devices, the present invention provides a feedback mechanism incorporated into and controlled by the policy distribution framework. This feedback means can extract and deliver quantitative data about traffic, usage and policy-decision results to the policy analysis server 306 (or other server that receives the feedback information) via the feedback communications mentioned above. The feedback communications are, in some instances, included in broader communications from the network intermediary devices that include operational information for the devices, such as but not limited to, health status, capacity-related metrics, usage statistics, policy-assessment metrics (those that assess whether and how well a previously installed policy is performing for example), etc. The feedback communications provide the policy analysis server (or other server that receives the feedback information) with specifically requested information relevant to the monitoring of policy effectiveness. Instructions to the intermediary devices concerning what data to gather and the conditions under which it is to be gathered may be specified through policy updates provided by the policy distribution server. Essentially then, the policy distribution framework allows an intermediary device vendor to remotely insert instrumentation into the request flow to the intermediary devices, and siphon off a targeted, source-reduced data stream with great flexibility.

Figure 4:
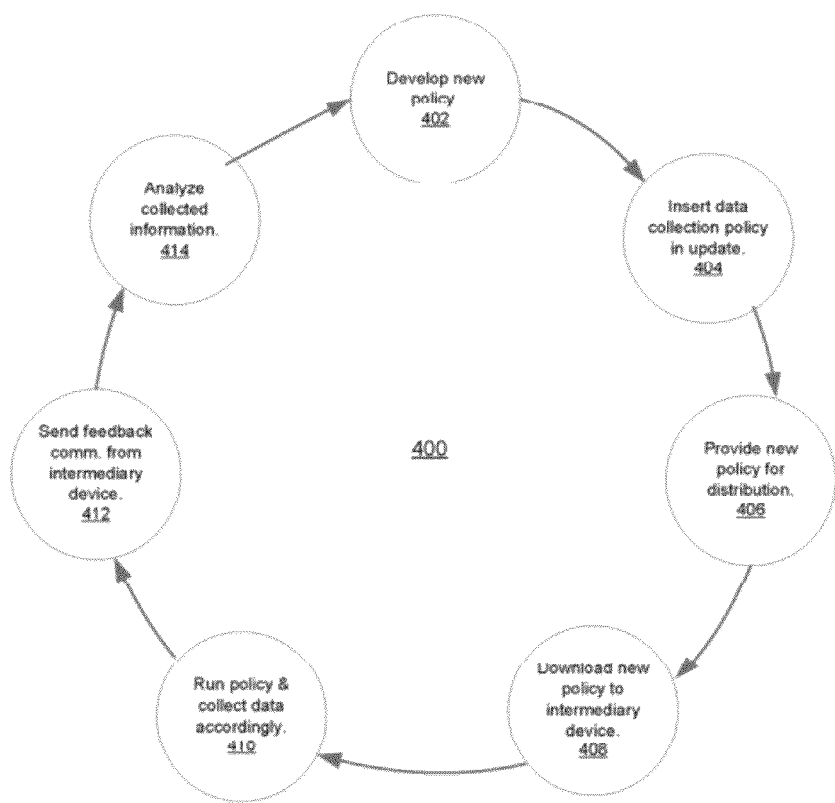
FIG. 4 illustrates an example of a process collecting and delivering automated feedback regarding policies implemented at network intermediary devices as part of feedback communications from the network intermediary devices in accordance with an embodiment of the present invention.

FIG. 4 highlights the general nature of a procedure 400 for collecting and delivering automated feedback regarding policies, such as caching policies, implemented at network intermediary devices, such as caching appliances and the like, as part of feedback communications from the network intermediary devices in accordance with an embodiment of the present invention. The feedback is provided according to policies or other directives distributed to the network intermediary devices along with other policy updates, such as caching policy updates, configuration changes or other, lightweight software distributions. These updates may be designed to accommodate changes in the behavior of content servers and to effect other desired behaviors of the network intermediary devices without the need for full scale operating system updates and the like.

Beginning at 402, a new caching policy is developed (note, although discussed with reference to a caching policy, this example is also applicable to other policies for network intermediary devices). This may be, at least in part, a manual process involving coding by human beings, but may also be, either fully or in part, an automated process based on automated analysis of the information collected at various intermediary devices. In either event, it is a process that takes into account data collected from in-service intermediary devices.

At 404, data collection heuristics or other directives (policy) are inserted into updates along with the caching policies. These data collection policies may be developed manually and/or automatically, according to new caching policies being deployed and/or observed problems with in-service intermediary device performance, etc. The data collection policies are preferably developed to instruct the intermediary devices to collect targeted data to assist in the evaluation of conditions of interest for the development or assessment of caching policies or for controlling other behaviors of intermediary devices.

At 406, the new caching policies, with the data collection policies included therein, are provided to the policy distribution server (e.g., by being stored in database 308 and the policy distribution server being notified thereof). Accordingly, the new policies will be available for distribution to the intermediary devices as each device checks in to receive any new policy updates.

At 408, the new policies are provided to an intermediary device when the device contacts the policy distribution server to request any new updates (in other embodiments, a "push" model may be used where policy updates are distributed in publication fashion, without the need for intermediary devices to specifically request same from the policy distribution server). Then, at 410, once the policy has been downloaded to and installed on the intermediary device, it is executed and data specified by the policy is collected by the intermediary device in accordance therewith.

At 412, the intermediary device transmits its feedback communication to the policy analysis and distribution center, and included therein is the data collected according to the data collection policy. This data is subsequently analyzed 414 by the policy analysis server, and new caching policies (and data collection policies) may be generated as a result. These new policies can then be provided to the policy database for distribution by the policy distribution server at the beginning of a new cycle.

Note that the process illustrated at 400 is not intended to illustrate any particular process followed by an intermediary device, but rather the overall procedure of using collected feedback information to produce policy updates and having the means for providing future feedback regarding the effectiveness those policy updates, etc, distributed as part of the policy update procedure itself. Intermediary devices, as has been noted above, operate somewhat asynchronously to this process flow by contacting the various servers at times, which may be dictated by the policies, but the downloading of policy updates need not wait until provision of a equipment health or other communication and providing feedback communications of the kind contemplated herein is not premised on receiving policy updates.

Among the benefits afforded by the present invention, the mechanism for both inserting the instrumentation and collecting the result is automatic and does not require customers to provide logs or other data. The gathered information can then be used to tune directives (e.g., caching directives) for the intermediary devices that supplied the feedback in a subsequent policy update, as well as update the information-gathering directives themselves.

Information gathered via the feedback process need not be limited to the attributes of user requests (though that alone is quite valuable in creating policy updates), but can also include the results of processing by the intermediary devices, including whether objects were found in cache (and perhaps, if they were so found, via what mechanism they were found), whether they were modified, revalidated, or replaced, and many other possibilities. Because the extraction of information is itself controlled by a subscription-delivered policy, it can be easily changed without requiring a complete software release or upgrade.

The gathered information can be provided in individual fashion, or it can be aggregated in a number of possible forms, for example, counts or accumulated values for some single quantity (e.g., numbers of requests adhering to some expressed criterion), counts or accumulated values broken down by a key generated from some aspect of network traffic (e.g., numbers of requests by domain for some criterion), histograms of accumulated values which break down a single quantity by distribution, and/or keyed value tables which quantify the consistency of discrete behaviors, indicate whether a behavior exhibits consistently or not, or if a behavior is non-uniform, etc. Aggregated information is then potentially filtered according to a set of dynamic rules, and transported back to the policy analysis server (or other server where policy evaluation is performed) for analysis and development of new policies.

In addition to collecting data useful for analyzing caching and other policies, the present methodologies may be employed to collect information useful for identifying web sites or other content sources that may respond well to an existing or in-service policy (e.g., new sites that are not currently cached according to site-specific policies but for which caching effectiveness may be improved or enhanced if they were to be so treated), or for identifying sites that should not be subjected to site-specific policies. Likewise, these mechanisms may be used to collect data to help identify which intermediary devices are or are not using previously published controls, rules, heuristics, policies, etc. In general, the policy updates are intended for widespread dissemination and use, but may include user-operable controls to activate or deactivate certain features or functions and it may be helpful for a caching vendor to know which policies, etc, are in wide spread use in in-service devices and which are not, etc.

The feedback communication reporting schedule may be periodic per intermediary device, but is preferably randomized across devices to avoid overloading the policy distribution server or other server receiving the feedback information. Likewise, the policy update-check frequency may be periodic per device and randomized across devices. Usually, though not necessarily, the policy update checks will be performed more frequently than the feedback information will be provided, but this need not necessarily be true for all implementations or all intermediary devices. Indeed, the frequency of both update checks and feedback communications may be subject to control by policies distributed in accordance with the present invention. For example, if feedback communications reveal a situation of interest, a policy update can be deployed to focus on the intermediary device of interest, or on requests for the website involved, by altering not just the feedback/data gathering rules but also the frequency of reporting.

The subscription delivery nature of the updates, and, hence, the instrumentation packages, means that instead of just applying to specific test systems, the instrumentation is applied to all deployed intermediary devices, thus effectively making the installed base of such devices a multi-node, globally-distributed, and consistent mechanism for sampling caching behavior and effectiveness and overall web usage patterns. The selection of which information to transmit as feedback is highly flexible and so can observe and monitor the performance and accuracy of a published "solutions", for example caching solutions for a troublesome web site in the face of exogenous changes.

The leveraging of a subscription/feedback channel to insert instrumentation can be applied in a number of other contexts. For example, one could use this mechanism to determine usage patterns in a content delivery network or determine which product features of specified devices are actually being enabled in the field (with what settings, effects and impacts). The same mechanism can also be used to understand and evaluate server farm characteristics, for example, how traffic is balanced and what the consequences of routing are. That is, in embodiments of the invention where deployed intermediary devices have request routing outside of the control of development and analysis agents, this type of functionality can be used to understand, evaluate and "tune" (e.g., impose internal routing or handling logic) the intermediary devices for the routing parameters.

Figure 5:
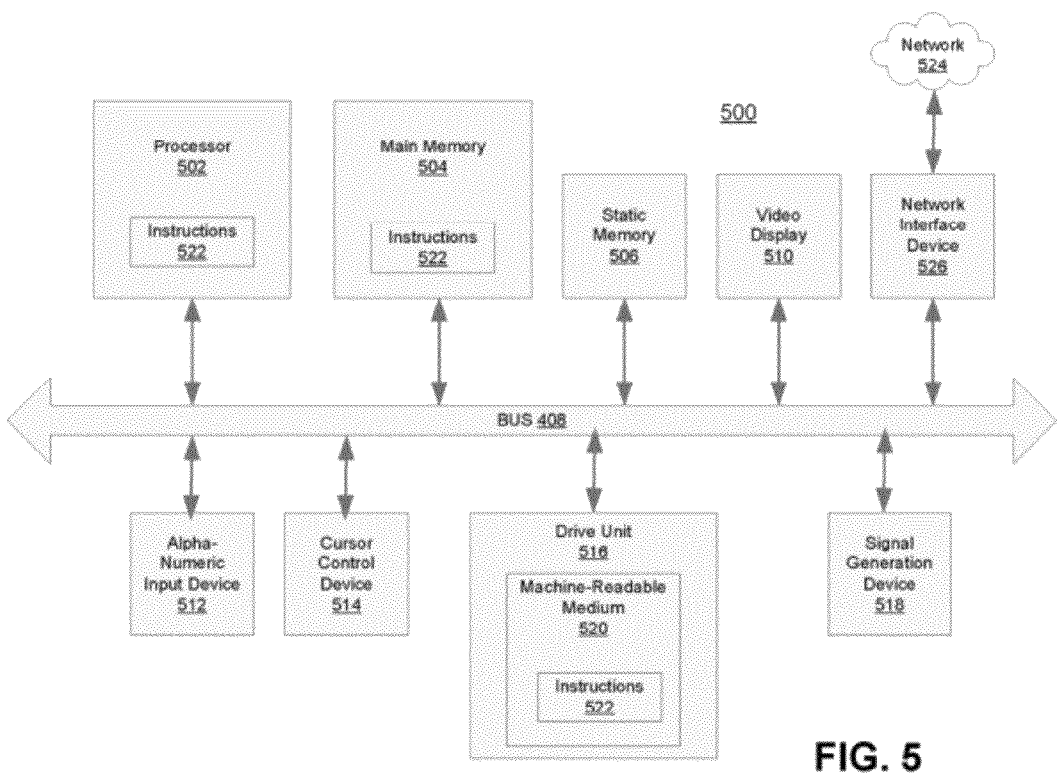
FIG. 5 illustrates an example of a computer device on which computer-executable instructions to perform the methodologies discussed herein may be installed and run.

As alluded to above, the various computer-based devices discussed in connection with the present invention may share similar attributes. FIG. 5 illustrates an exemplary form of a computer system 500, in which a set of instructions can be executed to cause the computer system to perform any one or more of the methodologies discussed herein. Computer system 500 may represent any or all of the clients, servers, or intermediary devices discussed herein. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU), a graphics processing unit (GPU), or both), a main memory 504 and a static memory 506, which communicate with each other via a bus 50g. The computer system 500 may further include a video display unit 510 (e.g., a liquid crystal display (LCD)). The computer system 500 also includes an alphanumeric input device 512 (e.g., a keyboard), a cursor control device 514 (e.g., a mouse), a disk drive unit 516, and a signal generation device 518 (e.g., a speaker) and a network interface device 526.

The disk drive unit 516 includes a machine-readable medium 520 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504, and the instruction-storing portions of processor 502 also constituting machine-readable media. The software 522 may further be transmitted or received over a network 524 via the network interface device 526.

While the machine-readable medium 520 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing a set of instructions for execution by the machine and that cause the machine to perform any one or more of the methodologies of the present invention. The term "machine-readable medium" shall accordingly be taken to included, but not be limited to solid-state memories, and optical and magnetic media.

Thus, systems and methods for collecting and delivering automated feedback regarding policies implemented at network caching appliances as part of feedback communications from the network caching appliances, said feedback being provided according to policies or other directives distributed to the network intermediary devices along with policy updates, configuration changes or other lightweight software distributions, have been described. Among the categories of information which can be collected in this fashion are counts or trends regarding the number of times a particular rule is executed or a condition is observed, the effect of a particular condition or set of conditions, bandwidth savings attributable to certain caching policies, improvements to request response times, improvements in transcoding or translations of requests, the identification of sites that would or are benefiting from site-specific policies or which would not so benefit, and correlations between key-value indicators that can assist in establishing new policies, overall cost reductions or improvements in client experiences (e.g., as measured by a variety of different metrics), and the like. It should be appreciated that the foregoing descriptions were intended to be illustrative only and the present invention should be measured only in terms of the claims, which follow.

What is claimed is:

1. A method, comprising:
automatically collecting, at network intermediary devices, data useful in analyzing effectiveness of policies for handling transactions involving client communications instantiated at the network intermediary devices;
delivering said data from the network intermediary devices to an analysis server as communications from the network intermediary devices;
developing, at the analysis server, new policies for handling the transactions based at least in part on the data collected at the network intermediary devices; and
distributing the new policies to the network intermediary devices, wherein the distributing further includes distributing future information-gathering directives.

2. The method of claim 1, wherein the communications are included in health monitoring communications from the network intermediary devices.

3. The method of claim 1, wherein the data is collected according to data collection directives distributed to the network intermediary devices along with updates to the policies for handling transactions.

4. The method of claim 3, wherein the new policies are configured to alter actions of the network intermediary devices to accommodate changes in behaviors of content servers from which the network intermediary devices obtain content in connection with the client communications.

5. A method, comprising:
including, in a policy update, information-gathering directives for network intermediary devices at which the policy update is to be instantiated;
delivering the information-gathering directives with the policy update to the network intermediary devices;
collecting, at the network intermediary devices, data according to the information-gathering directives;
returning, from the network intermediary devices, the data collected according to the information-gathering directives, said data being returned as part of feedback communications from the network intermediary devices; and
developing, at an analysis server, at least one new policy based at least in part on the data collected at the network intermediary devices; and
distributing a subsequent policy update to the network intermediary devices according to the at least one new policy, wherein the distributing further includes distributing future information-gathering directives.

6. The method of claim 5, wherein the data collected according to the information-gathering directives includes results of processing by the network intermediary devices.

7. The method of claim 5, wherein the data collected according to the information-gathering directives includes some or all of indications of whether objects were found in caches maintained at the network intermediary devices, mechanisms by which objects were found in the caches, and whether the objects so found were modified, revalidated, or replaced.

8. The method of claim 5, wherein the data collected according to the information-gathering directives includes some or all of individual metrics, or aggregated metrics.

9. The method of claim 5, wherein the data collected according to the information-gathering directives includes some or all of counts or accumulated values for a single quantity, counts or accumulated values broken down by a key generated from an aspect of traffic observed by the network intermediary devices, histograms of accumulated values which break down a single quantity by distribution, and/or keyed value tables which quantify consistency of discrete behaviors, indicate whether a behavior exhibits consistently or not, or if a behavior is non-uniform.

10. The method of claim 5, wherein the data collected according to the information-gathering directives includes information useful for identifying web sites or other content sources that may respond well to an existing or in-service caching policy.

11. The method of claim 5, wherein the data collected according to the information-gathering directives includes information useful for identifying sites that should not be subjected to site-specific caching policies.

12. The method of claim 5, wherein the data collected according to the information-gathering directives includes information to help identify which network intermediary devices are or are not using previously published controls, rules, heuristics, or policies.

13. A system, comprising:
a policy analysis server communicatively coupled to a plurality of network intermediary devices, the policy analysis server being configured to receive, from the network intermediary devices, data useful in analyzing effectiveness of policies for handling transactions involving client communications instantiated at the network intermediary devices, said data being received from the network intermediary devices as part of feedback communications from the network intermediary devices; and
a policy distribution server communicatively coupled to the plurality of network intermediary devices and configured to deliver to the network intermediary devices a policy update which is based at least in part on the data received at the policy analysis server from the network intermediary devices, the policy distribution server further configured to deliver information-gathering directives for the network intermediary devices as part of the policy update, said information-gathering directives updating data collection operations of the network intermediary devices.

14. The system of claim 13, wherein the policy update further includes caching policies for the network intermediary devices specifying site-specific behaviors for one or more web servers communicatively coupled to the network intermediary devices.

15. The method of claim 5, wherein the data collected according to the information-gathering directives includes some or all of information useful in determining usage patterns in a content delivery network, information useful to determine which product features of the network intermediary devices are actually enabled in the various network intermediary devices and with what settings, effects and impacts, and information useful for understanding and evaluating server farm characteristics.

16. The method of claim 1, wherein the future information-gathering directives are according to at least one of new caching policies and observed problems with performance of the network intermediary devices.

* * * * *